US008265689B2

(12) United States Patent
Ron

(10) Patent No.: US 8,265,689 B2
(45) Date of Patent: Sep. 11, 2012

(54) MULTI-TAPPING NUMPAD

(75) Inventor: Uri Ron, Tel Aviv (IL)

(73) Assignee: Google Inc., Mountain View, CA (US)

( * ) Notice: Subject to any disclaimer, the term of this patent is extended or adjusted under 35 U.S.C. 154(b) by 592 days.

(21) Appl. No.: 12/344,292

(22) Filed: Dec. 26, 2008

(65) Prior Publication Data

US 2010/0004025 A1  Jan. 7, 2010

Related U.S. Application Data

(60) Provisional application No. 61/009,523, filed on Dec. 28, 2007.

(51) Int. Cl.
*H04M 1/00* (2006.01)
*H03M 11/04* (2006.01)

(52) U.S. Cl. .................. 455/550.1; 341/22; 379/433.07

(58) Field of Classification Search ............. 379/433.07; 341/22, 26, 23; 455/550.1, 565, 566, 575.1; 345/168, 169
See application file for complete search history.

(56) References Cited

U.S. PATENT DOCUMENTS

| 5,677,949 A | | 10/1997 | Macor | |
|---|---|---|---|---|
| 6,011,554 A | | 1/2000 | King et al. | |
| 6,052,070 A | * | 4/2000 | Kivela et al. | ..................... 341/22 |
| 6,219,731 B1 | | 4/2001 | Gutowitz | |
| 6,546,239 B1 | | 4/2003 | Pazdersky et al. | |
| 6,625,283 B1 | * | 9/2003 | Sato | ........................ 379/433.07 |
| 6,744,423 B2 | * | 6/2004 | Kraft et al. | ..................... 345/169 |
| 6,904,148 B1 | * | 6/2005 | Yabusaki | ................ 379/433.07 |
| 7,860,536 B2 | * | 12/2010 | Jobs et al. | ..................... 455/566 |
| 2005/0140650 A1 | * | 6/2005 | Lang | ........................... 345/160 |
| 2007/0072647 A1 | | 3/2007 | Mousseau et al. | |
| 2007/0186017 A1 | * | 8/2007 | Wormald | ........................ 710/67 |
| 2007/0216659 A1 | | 9/2007 | Amineh | |
| 2007/0273648 A1 | | 11/2007 | Fussinger | |
| 2008/0062016 A1 | * | 3/2008 | Pham | .............................. 341/23 |
| 2010/0088087 A1 | * | 4/2010 | Spjuth | ................................ 704/9 |
| 2010/0225591 A1 | * | 9/2010 | Macfarlane | ................... 345/169 |
| 2010/0271241 A1 | * | 10/2010 | Weller | ........................... 341/22 |

FOREIGN PATENT DOCUMENTS

| EP | 1768363 A1 | 3/2007 |
|---|---|---|
| WO | 2008106729 A1 | 9/2008 |

OTHER PUBLICATIONS

Firefly Mobile: The Mobile Phone for Mobile Kids, Jan. 13, 2009 http://www.fireflymobile.com/store/firefly/.

* cited by examiner

*Primary Examiner* — Howard Williams
(74) *Attorney, Agent, or Firm* — Soquel Group LLC

(57) ABSTRACT

A mobile phone including a number keypad for entering the symbols 0-9, # and *, the keypad including at most five keys at least one of which corresponds to a list of at least two symbols, wherein the $n^{th}$ symbol in the list corresponding to a key is accessed by tapping on the key n times, with cycling from the end of the list back to the beginning of the list. A portable media player with dual use as a cell phone is also described and claimed.

15 Claims, 4 Drawing Sheets

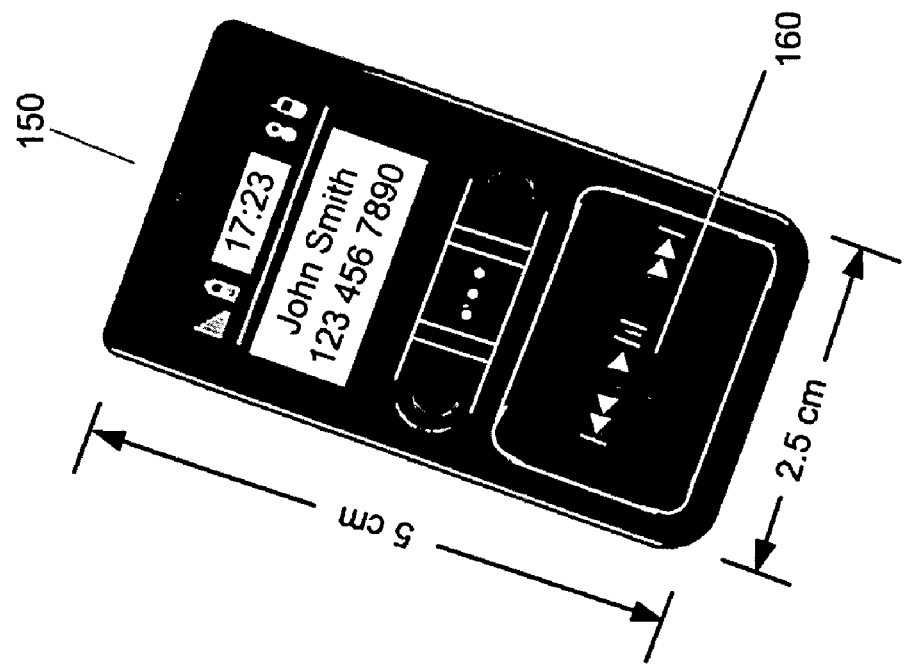
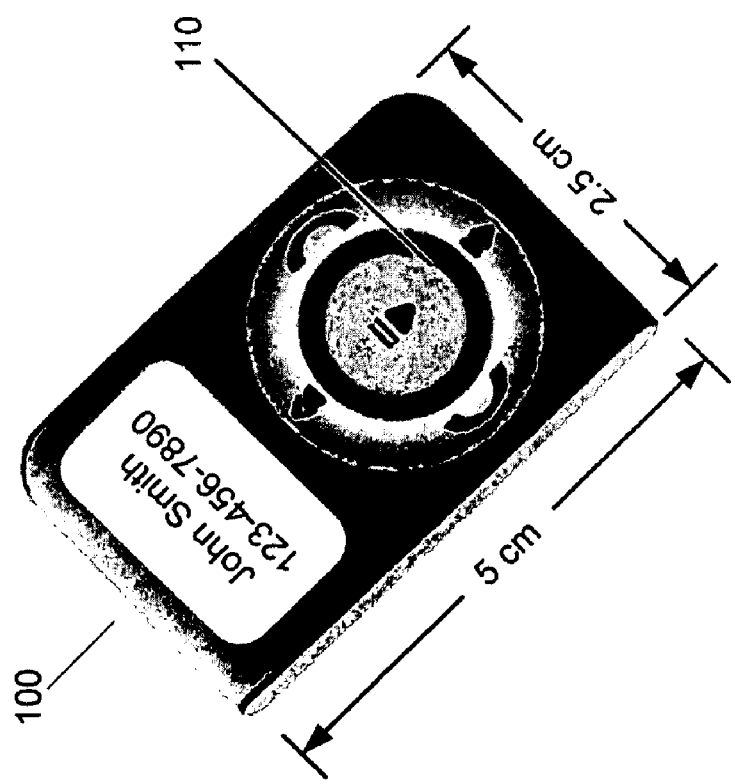
FIG. 1

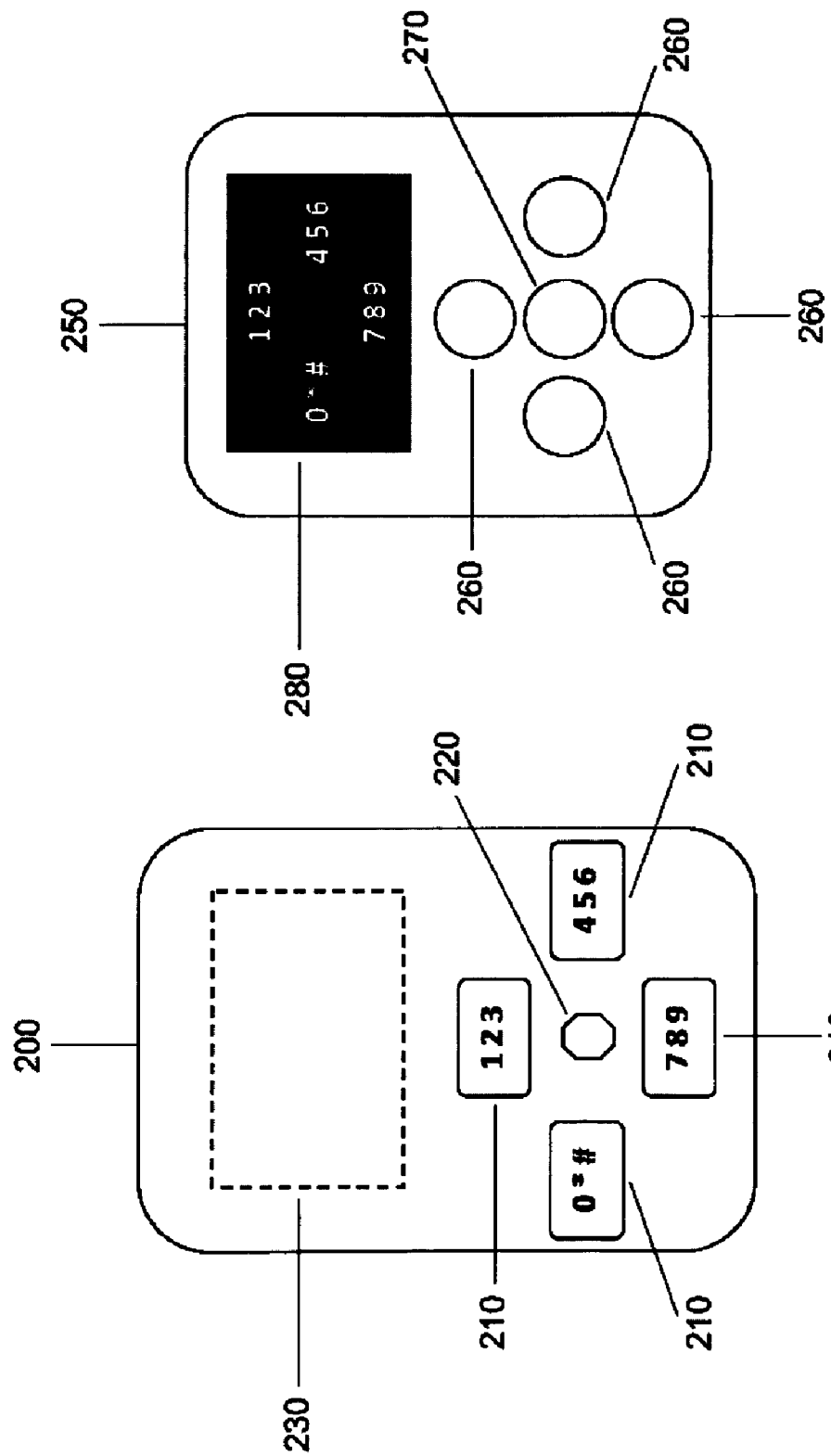

MULTI-TAPPING NUMPAD

PRIORITY REFERENCE TO RELATED APPLICATIONS

This application claims benefit of assignee's provisional patent application U.S. Provisional Application No. 61/009,523, entitled MULTI-TAPPING NUMPAD, filed on Dec. 28, 2007 by inventor Uri Ron.

FIELD OF THE INVENTION

The field of the present invention is keypads for mobile phones.

BACKGROUND OF THE INVENTION

Mobile phones are becoming increasingly popular, and people generally carry their phones with them at all times. As such, it is of advantage to reduce the sizes and weights of phones, in order to make them more convenient to carry.

One of the main limiting factors of miniaturization of phones is keypad size. Conventional keypads include twelve keys, and have already been reduced in size to the threshold where it is difficult for a person to dial phone numbers quickly and accurately.

Ideally, by reducing the number of keys in a phone's keypad, the size of the phone may be reduced. However, with fewer than twelve keys there are not enough keys to support the ten symbols 0-9, and the two symbols * and #, which are required for dialing.

Today, miniature phones have been integrated within watches. Cell phone watches, such as the M500 Cellwatch™ manufactured and distributed by My Mobile Watch of Shenzhen City, China, and the W-100 Watch manufactured by Hyundai Corporation of Seoul, Korea, use touch screens for dialing. Other cell phone watches use scrolling between digits to select them one at a time for dialing.

These and other miniature phones use entry mechanisms that are cumbersome, or use pre-defined phone numbers for short code dialing. It would thus be of advantage to provide a miniature phone keypad with a simple intuitive mechanism for entering phone numbers.

SUMMARY OF THE DESCRIPTION

Aspects of the present invention provide a flexible keypad with at most five keys for use in dialing phone numbers on miniature phones. The miniature phones may have physical dimensions on the order of 2.5 cm×5 cm or smaller.

There is thus provided in accordance with an embodiment of the present invention a mobile phone including a number keypad for entering the symbols 0-9, # and *, the keypad including at most five keys at least one of which corresponds to a list of at least two symbols, wherein the $n^{th}$ symbol in the list corresponding to a key is accessed by tapping on the key n times, with cycling from the end of the list back to the beginning of the list.

There is additionally provided in accordance with an embodiment of the present invention a mobile phone including a number keypad for entering the symbols 0-9, # and *, the keypad including at most five keys at least one of which corresponds to a list of at least two symbols, wherein pressing and holding a key causes symbols in the list corresponding to the key to be accessed sequentially in time, with cycling from the end of the list back to the beginning of the list.

There is moreover provided in accordance with an embodiment of the present invention a portable media player with dual use as a cell phone, including a keypad with a plurality of keys, at least one of which is used for dialing a phone number and corresponds to a list of at least two symbols, wherein the $n^{th}$ symbol in the list corresponding to a key is accessed by tapping on the key n times, with cycling from the end of the list back to the beginning of the list.

BRIEF DESCRIPTION OF THE DRAWINGS

The present invention will be more fully understood and appreciated from the following detailed description, taken in conjunction with the drawings in which:

FIG. 1 is an illustration of miniature mobile phones with reduced keypads, in accordance with an embodiment of the present invention;

FIG. 2A is an illustration of a small mobile phone with a multi-tap keypad with five keys for accessing the symbols 0-9, * and #, with symbols corresponding to keys engraved on the keys, in accordance with an embodiment of the present invention;

FIG. 2B is an illustration of a small mobile phone with a multi-tap keypad with five keys for accessing the symbols 0-9, * and #, with symbols corresponding to keys presented on a display, in accordance with an embodiment of the present invention;

DETAILED DESCRIPTION

Figure 3A:
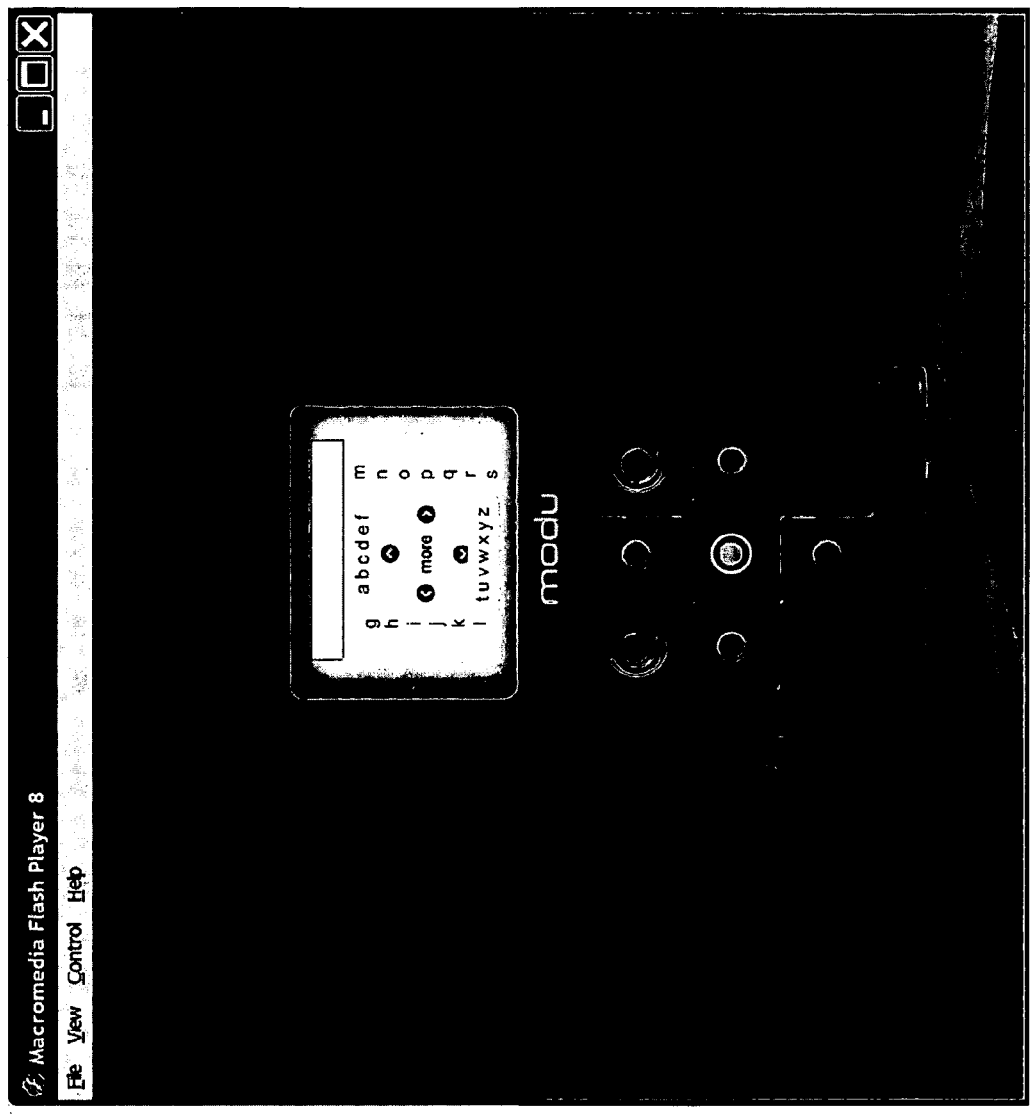
FIG. 3A is an illustration of a small mobile phone with a multi-tap keypad used for composing SMS messages, in accordance with an embodiment of the present invention.

Aspects of the present invention relate to miniature mobile phones with reduced keypads, such as phone 100 and keypad 110, and phone 150 and keypad 160 illustrated in FIG. 1. As shown in FIG. 1, phones 100 and 150 are on the order of 2.5 cm×5 cm, which is smaller than a standard sized credit card.

Reference is now made to FIG. 2A, which is an illustration of a small mobile phone 200 with a multi-tap keypad with five keys for accessing the symbols 0-9, * and #, with symbols corresponding to keys engraved on the keys, in accordance with an embodiment of the present invention. Mobile phone 200 has a reduced keypad with four keys 210 surrounding a center key 220, similar to the layout of the keypad 110 in FIG. 1. Each of the four keys 210 has a list of three symbols printed on the keys. The list of symbols for a key represents the symbols that that key can enter. Key 220 is a select or general function key.

In one embodiment of the present invention, tapping a key 210 n times accesses the $n^{th}$ symbol in the list printed on the key. Additional taps on a key 210 beyond three taps, cycle back around to the beginning of the list. The rightmost key 210, for example, cycles through 4-5-6-4-5-6-4-etc. when tapped successively. Tapping on this key once accesses 4, tapping twice accesses 5, tapping three time accesses 6, tapping four times accesses 4, tapping five times accesses 5, etc. Tapping on a different key, or stopping the tapping for a pre-designated period of time, causes the currently accessed symbol to be entered.

In another embodiment of the present invention, pressing and holding a key 210 causes symbols to be accessed in time in a sequential cyclic order, from the list of symbols printed on the key. Releasing the key causes a currently accessed symbol to be entered.

In yet another embodiment of the present invention, both tapping and pressing are enabled, and symbols can be accessed by either tapping one or more times on a key, or by pressing and holding the key. TABLE I summarizes these two modes of symbol access and entry.

TABLE I

Modes for entering symbols from a list of symbols corresponding to a key

| | Symbol Access | Symbol Entry |
|---|---|---|
| Multi-tap mode | Tapping on the key one or more times | Stopping to tap, or tapping on a different key |
| Press and hold mode | Pressing and holding the key | Releasing the key |

The four keys 210 span twelve symbols, resulting in a ratio of 3 symbols per key. Conventional telephone keypads span the 26 alphabetical characters using eight keys, resulting in a ratio of 3.25 symbols per key. As such, the keypad of mobile phone 200 is more efficient for data entry than conventional keypads are.

It will be appreciated by those skilled in the art that the correspondence between symbols and keys is arbitrary for the present invention. The lists of symbols illustrated in FIG. 2A are 1-2-3, 4-5-6, 7-8-9 and 0-*-#, but other lists may be implemented instead. For example, 0-1-2, 3-4-5, 6-7-8 and 9-*-#. In addition, the present invention may be implemented with fewer keys than shown in FIG. 2A. With three keys, for example, the symbols may be distributed into lists as 1-2-3-4, 5-6-7-8 and 9-0-*-#, with 4 symbols per key.

Reference is now made to FIG. 2B, which is an illustration of a mobile phone 250 with a multi-tap keypad with five keys for accessing the symbols 0-9, * and #, with symbols corresponding to keys presented on a display, in accordance with an embodiment of the present invention. Mobile phone 250 has a reduced keypad with four keys 260 surrounding a center key 270, and has a display 280. Each of the four keys 260 corresponds to a list of three symbols. A visual snapshot of the four keys 260 and their corresponding lists of symbols are rendered in display 280. Symbols from the list corresponding to a key 260 are entered for dialing by either tapping on the key one or more times, or by pressing and holding the key, as described hereinabove with reference to FIG. 2A.

It will be appreciated by those skilled in the art that the present invention may be embodied in a mobile phone without a display screen. For such an embodiment, the symbols a user has entered can be presented to him by an audio read-out, or by a small display field on the mobile phone. Alternatively, there may not be a presentation of symbols entered, relying instead on the user's memory. An embodiment without a display screen enables the size of the mobile phone to be significantly reduced.

In this regard, an advantage of the present invention is the intuitiveness of the keys and their symbol lists, making it easy for users to memorize locations of keys and their corresponding lists. As such, users can dial without looking at the keys or at the display screen. Such advantage is particularly useful in dark settings without background light, and where the keys are not backlit.

In accordance with the present invention, physical engravings and physical features are added to the keys, as an assist for dialing without looking at the keys.

Figure 3B:
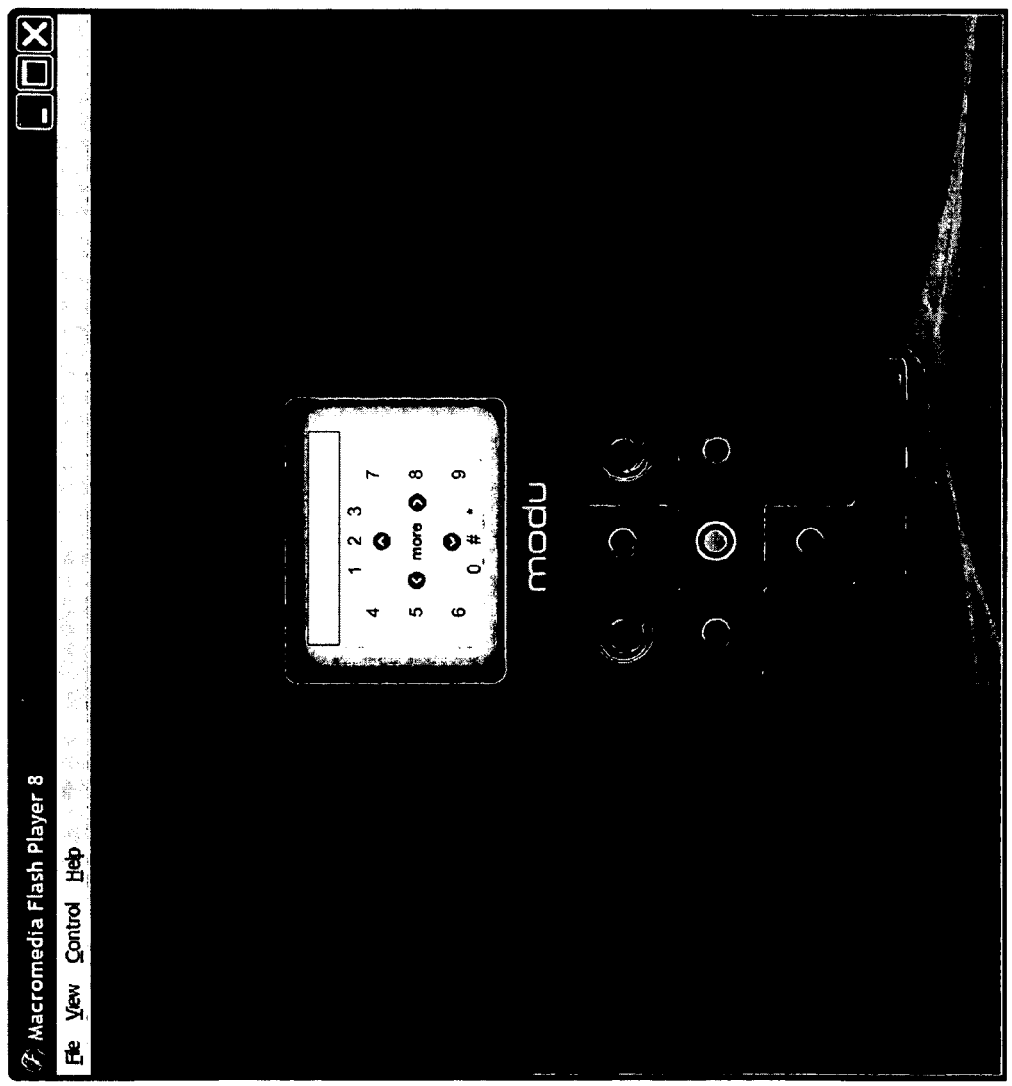
FIG. 3B is an illustration of the small mobile phone of FIG. 3A used for dialing phone numbers, in accordance with an embodiment of the present invention.

Reference is now made to FIGS. 3A and 3B, which are illustrations of a small mobile phone with a mufti-tap keypad, in accordance with an embodiment of the present invention. FIG. 3A shows use of the small mobile phone for composing SMS messages, and FIG. 3B shows use of the small mobile phone for dialing phone numbers. When the keypad is used for composing SMS messages, the display presents the 26 message-related symbols, a-z, according to four keys of the keypad, corresponding to 6.5 symbols per key. When the keypad is used for dialing, the display presents 12 dialing-related symbols according to four keys of the keypad. By presenting different lists of symbols on the display, multiple use is made of the same reduced keypad.

Those skilled in the art will appreciate from FIG. 1 that the present invention supports an unlimited variety of keypad designs, with customized looks for different vendors.

Moreover, the present invention enables dual use of keypads designed for electronics devices other than phones, for use with phones as well. Keypads 110 and 160 shown in FIG. 1 were originally designed for portable media players. Using the present invention, the portable media players may be enhanced with phone functionality and their keypads may be used both for playing media and for dialing phone calls.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A mobile phone comprising a number keypad for entering the symbols 0-9, # and *, the keypad comprising at most five keys at least one of which corresponds to a list of at least three symbols, wherein pressing and holding a key causes all symbols in the list corresponding to the key to be accessed sequentially in time, with cycling from the end of the list back to the beginning of the list.

2. The mobile phone of claim 1 wherein a desired symbol from a list corresponding to a key is entered by pressing and holding the key to access the desired symbol, and then releasing the key.

3. The mobile phone of claim 1 wherein four of said keys are arranged around a center key, and wherein the lists of symbols corresponding to the four surrounding keys are 1-2-3, 4-5-6, 7-8-9 and 0-*-#.

4. The mobile phone of claim 1 wherein four of said keys in said keypad are positioned around a center key, and wherein the lists of symbols corresponding to the four surrounding keys are 0-1-2, 3-4-5, 6-7-8 and 9-*-#.

5. The mobile phone of claim 1 wherein the lists of symbols corresponding to three of said keys in said keypad are 1-2-3-4, 5-6-7-8 and 9-0-*-#.

6. The mobile phone of claim 1 wherein the lists of symbols corresponding to said keys are engraved on said keys.

7. The mobile phone of claim 1 further comprising a display screen, and wherein the lists of symbols corresponding to said keys are rendered on said display screen.

8. A mobile phone comprising a number keypad for entering the symbols 0-9, # and *, the keypad comprising at most five keys at least one of which corresponds to a list of at least three symbols, wherein the $n^{th}$ symbol in the list corresponding to a key is accessed by tapping on that key n times, with cycling from the end of the list back to the beginning of the list.

9. The mobile phone of claim 8 wherein a desired symbol from a list corresponding to a key is entered by tapping on the key to access the desired symbol, and then stopping the tapping.

10. The mobile phone of claim 8 wherein a desired symbol from a list corresponding to a key is entered by tapping on the key to access the desired symbol, and then tapping on a different key.

11. The mobile phone of claim 8 wherein four of said keys are arranged around a center key, and wherein the lists of symbols corresponding to the four surrounding keys are 1-2-3, 4-5-6, 7-8-9 and 0-*-#.

12. The mobile phone of claim 8 wherein four of said keys in said keypad are positioned around a center key, and wherein the lists of symbols corresponding to the four surrounding keys are 0-1-2, 3-4-5, 6-7-8 and 9-*-#.

13. The mobile phone of claim 8 wherein the lists of symbols corresponding to three of said keys in said keypad are 1-2-3-4, 5-6-7-8 and 9-0-*-#.

14. The mobile phone of claim 8 wherein the lists of symbols corresponding to said keys are engraved on said keys.

15. The mobile phone of claim 8 further comprising a display screen, and wherein the lists of symbols corresponding to said keys are rendered on said display screen.

* * * * *